US005254423A

United States Patent [19]

Mayama et al.

[11] Patent Number: 5,254,423

[45] Date of Patent: Oct. 19, 1993

[54] ELECTROPHOTOGRAPHIC PHOTOSENSITIVE MEMBER, AND ELECTROPHOTOGRAPHIC APPARATUS, DEVICE UNIT AND FACSIMILE MACHINE HAVING THE PHOTOSENSITIVE MEMBER

[75] Inventors: Shinya Mayama, Yamato; Naoto Fujimura, Yokohama; Toshiyuki Yoshihara, Inagi; Kiyoshi Sakai, Hachioji; Hideki Anayama, Yokohama; Hideyuki Ainoya, Tokyo; Katsumi Aoki, Yokohama, all of Japan

[73] Assignee: Canon Kabushiki Kaisha, Tokyo, Japan

[21] Appl. No.: 962,333

[22] Filed: Oct. 16, 1992

[30] Foreign Application Priority Data

Oct. 17, 1991 [JP] Japan ................................ 3-296645

[51] Int. Cl.[5] ..................... G03G 5/147; G03G 15/22; H04N 1/23

[52] U.S. Cl. ....................................... 430/58; 430/66; 430/67; 430/96; 355/211; 358/300; 358/302

[58] Field of Search ....................... 430/58, 66, 67, 96; 355/211; 358/300, 302

[56] References Cited

U.S. PATENT DOCUMENTS

| | | | |
|---|---|---|---|
| 4,681,922 | 7/1987 | Schmidt et al. | 525/474 |
| 4,732,949 | 3/1988 | Paul et al. | 525/464 |

FOREIGN PATENT DOCUMENTS

| | | |
|---|---|---|
| 146827 | 7/1985 | European Pat. Off. . |
| 193757 | 9/1986 | European Pat. Off. . |
| 356246 | 2/1990 | European Pat. Off. . |
| 429116 | 5/1991 | European Pat. Off. . |
| 54-143645 | 11/1979 | Japan . |
| 61-62039 | 3/1986 | Japan . |
| 61-62040 | 3/1986 | Japan . |
| 61-132954 | 6/1986 | Japan . |

OTHER PUBLICATIONS

Patent Abstract of Japan, vol. 14, No. 561 (P-1142), Dec. 13, 1990 for JPA-2-240655.

*Primary Examiner*—Roland Martin

*Attorney, Agent, or Firm*—Fitzpatrick, Cella, Harper & Scinto

[57] ABSTRACT

The present invention provides an electrophotographic photosensitive member comprising a conductive support and a photosensitive layer provided thereon, wherein the surface layer of the electrophotographic photosensitive member contains a polymer having a component unit represented by the following Formula (1) and a polymer having a component unit represented by the following Formula (2) and a component unit represented by the following Formula (3) in a certain proportion.

Formula (1):

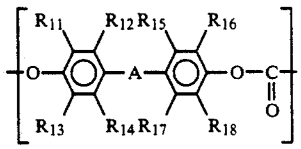

(1)

Formula (2):

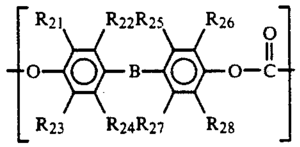

(2)

Formula (3):

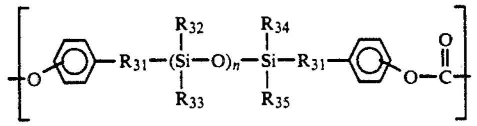

(3)

27 Claims, 1 Drawing Sheet

ELECTROPHOTOGRAPHIC PHOTOSENSITIVE MEMBER, AND ELECTROPHOTOGRAPHIC APPARATUS, DEVICE UNIT AND FACSIMILE MACHINE HAVING THE PHOTOSENSITIVE MEMBER

BACKGROUND OF THE INVENTION

1. Field of the Invention

The present invention relates to an electrophotographic photosensitive member. More particularly it relates to an electrophotographic photosensitive member having a photosensitive layer containing a resin of a specific structure. The present invention is also concerned with an electrophotographic apparatus, a device unit and a facsimile machine that have said photosensitive member.

2. Related Background Art

In recent years, a large number of electrophotographic photosensitive members using an organic photoconductive material have been proposed and practically used because of their advantages such as environmental safety, a high productivity, the readiness for material designing and the prospect of further improvements. For these electrophotographic photosensitive members, various properties such as electrical, mechanical and optical properties are required in accordance with the electrophotographic process. In particular, for the electrophotographic photosensitive members which are repeatedly used, the durability to the electrical or mechanical external force is required, which external forces directly act on their surfaces during corona charging, imagewise exposure, toner developing, transfer to paper and cleaning processes.

Specifically required for electrophotographic photosensitive members is having a durability to the deterioration of performances due to ozone generated during corona charging, i.e., a decrease in sensitivity, a decrease in potential, an increase in residual potential, as well as the resistance of the surfaces to the wear and scratches due to sliding friction during transfer and cleaning processes.

In general, the surface of an electrophotographic photosensitive member is made of a very thin resin layer, therefore the properties of the resin are very important. As a resin satisfying the above conditions, polycarbonate resins having a bisphenol-A skelton have been used. These resins, however, do not possess all of the necessary properties required for resins used in electrophotographic photosensitive members, and they have the problems as shown below.

(1) Poor solubility: They only show a good solubility in some of halogenated aliphatic hydrocarbons such as dichloromethane and 1,2-dichloroethane. Since the boiling points of these halogenated aliphatic hydrocarbons are low, photosensitive members manufactured using a coating solution prepared from any of these solvents tend to have whitened coatings. In addition, when such a solvent is used, it is not easy to control the solid contents in coating solutions.

(2) Other than the halogenated aliphatic hydrocarbons, the resins are partly soluble in tetrahydrofuran, dioxane, cyclohexane or a mixed solvent of these. These solvents, however, have a poor stability with time such that they may gel in few days, and are not suitable for the manufacture of photosensitive members.

(3) Moreover, even if the disadvantages stated in the paragraphs (1) and (2) are overcome, solvent cracking tends to occur in polycarbonate resins having only bisphenol-A or a bisphenol-A derivatives as a main chain skeleton.

(4) Furthermore, in the case of the conventional polycarbonate resins, a film formed from such a resin is poor in lubricity, which tends to cause fall faulty images due to the scratches made on the photosensitive member, faulty cleaning due to early deterioration of the cleaning blade and faulty cleaning due to turnover of a cleaning blade.

With regard to the solvent stability mentioned in the paragraphs (1) and (2), use of bisphenol-Z type polycarbonate resins (hereinafter "polycarbonate-Z resins") having a bulky cyclohexylene group has solved these problems. The polycarbonate-Z resins, however, show relatively large volume shrinkage especially when films are formed by casting using solutions, so that a stress often remains in the films. Hence they have had a disadvantage of a relatively weak resistance to stress corrosion. As a means for solving this problem, for example, Japanese Patent Application Laid-open No. 61-62040 discloses a method in which polycarbonate-A resin and polycarbonate-Z resin are mixed so that any cracking due to stress corrosion can be decreased. Japanese Patent Application Laid-open No. 61-62039 also discloses a method in which bisphenol-A and bisphenol-A are copolymerized so that any cracking due to stress corrosion can be decreased. Both the methods, however, are unsatisfactory means against the solvent cracking.

Besides this problem, as noted in the paragraph (4), conventional polycarbonate resins have a relatively low lubricity to a cleaning blade used in the electrophotographic process, which may cause turnover of the cleaning blade during running resulting in faulty cleaning, or scratches because of a strong force applied to the photosensitive member drum. Such disadvantages have been pointed out in the art. As a means for overcoming such disadvantages, a method is known in which silicone oil is added or in which, as disclosed in Japanese Laid-Open Patent Application No. 61-132954, polydimethylsiloxane blocks are copolymerized with a polycarbonate resin. However, the method of silicone addition has the disadvantages that it causes the deterioration of electrical characteristics in electrophotography, specifically, of sensitivity and residual potential, and that long-lasting lubricity cannot be obtained due to the loss of silicone oil on the surface layer with progressive running.

Use of the aforesaid copolymerization product of polydimethylsiloxane blocks can bring about a good lubricity. However, conventional polydimethylsiloxane copolymers have a problem such that a solution thereof becomes milky-white or gels and that their use in the surface layers of electrophotographic photosensitive members is not satisfactory in view of durability or running performance.

In addition, due to the demand for the high sensitivity of organic electrophotographic photosensitive members, low-molecular weight compounds such as a charge-transporting material are often added in a large quantity which may cause the separation of the low-molecular weight compound when electrophotographic photosensitive members are stored for a long period of time, bringing about the problem of layer separation.

SUMMARY OF THE INVENTION

An object of the present invention is to solve the problems which arise when a polycarbonate resin is used as a material for the surface layer of the electrophotographic photosensitive member, and to provide an electrophotographic photosensitive member having superior mechanical properties and durability because of an improved lubricity and wear resistance, promising good storage stability and also allowing easy manufacture.

Another object of the present invention is to provide an electrophotographic apparatus, a device unit and a facsimile machine that have such an electrophotographic photosensitive member.

The present invention provides an electrophotographic photosensitive member comprising a conductive support and a photosensitive layer provided thereon, wherein the surface layer of said electrophotographic photosensitive member contains a polymer having a component unit represented by the following Formula (1) and a polymer having a component unit represented by the following Formula (2) and a component unit represented by the following Formula (3).

Formula (1):

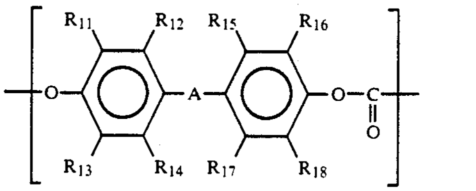

(1)

wherein A represents a straight-chain, branched or cyclic alkylidene group having 1 to 15 carbon atoms, an aryl-substituted alkylidene group, an arylenedialkylidene group, or —O—, —S—, —CO—, —SO— or —$SO_2$—; and $R_{11}$ to $R_{18}$ each represents a hydrogen atom, a halogen atom, an alkyl group having 1 to 4 carbon atoms, an alkenyl group having 2 to 4 carbons or an aryl group.

Formula (2):

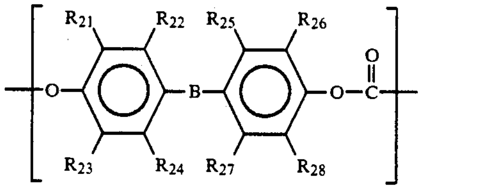

(2)

wherein B represents a straight-chain, branched or cyclic alkylidene group having 1 to 10 carbon atoms, an aryl-substituted alkylidene group, an arylenedialkylidene group, or —O—, —S—, —CO—, —SO— or —$SO_2$—; and $R_{21}$ to $R_{28}$ each represent a hydrogen atom, a halogen atom, an alkyl group having 1 to 4 carbon atoms or an alkenyl group.

Formula (3):

-continued

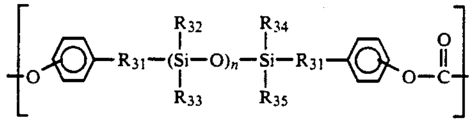

(3)

wherein $R_{31}$ represents an alkylene group or alkylidene group having 2 to 6 carbon atoms; $R_{32}$ to $R_{35}$ each represents an alkyl group having 1 to 3 carbon atoms, a phenyl group or a substituted phenyl group; and n represents an integer of 1 to 200.

The present invention also provides an electrophotographic apparatus, a device unit and a facsimile machine each having the electrophotographic photosensitive member as described above.

DESCRIPTION OF THE PREFERRED EMBODIMENTS

Figure 1:
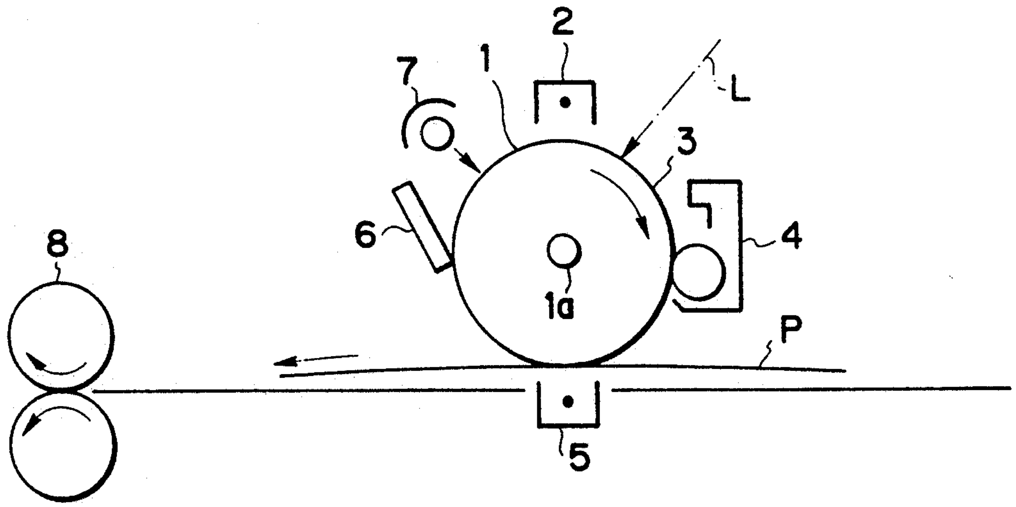
FIG. 1 schematically illustrates an example of the electrophotographic apparatus having the electrophotographic photosensitive member of the present invention.

The electrophotographic photosensitive member of the present invention has a photosensitive layer containing a polymer having a component unit represented by the following Formula (1) and a polymer having a component unit represented by the following Formula (2) and a component unit represented by the following Formula (3).

Formula (1):

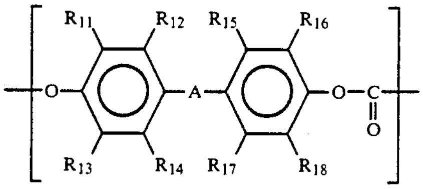

(1)

wherein A represents a straight-chain, branched or cyclic alkylidene group having 1 to 15 carbon atoms, an aryl-substituted alkylidene group, an arylenedialkylidene group, or —O—, —S—, —CO—, —SO— or —$SO_2$—; and $R_{11}$ to $R_{18}$ each represent a hydrogen atom, a halogen atom, an alkyl group having 1 to 4 carbon atoms, an alkenyl group having 2 to 4 carbon atoms or an aryl group.

Formula (2):

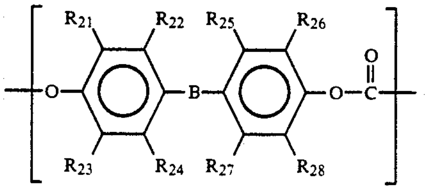

(2)

wherein B represents a straight-chain, branched or cyclic alkylidene group having 1 to 10 carbon atoms, an aryl-substituted alkylidene group, an arylenedialkylidene group, or —O—, —S—, —CO—, —SO— or —$SO_2$—; and $R_{21}$ to $R_{28}$ each represent a hydrogen atom, a halogen atom, an alkyl group having 1 to 4 carbon atoms or an alkenyl group having 2 to 4 carbon atoms.

Formula (3):

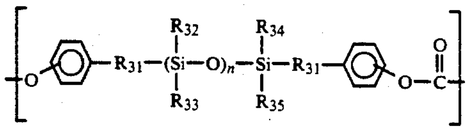
(3)

wherein $R_{31}$ represents an alkylene group or alkylidene group having 2 to 6 carbon atoms; $R_{32}$ to $R_{35}$ each represent an alkyl group having 1 to 3 carbon atoms, a phenyl group or a substituted phenyl group; and n represents an integer of 1 to 200.

Preferable examples of the component unit represented by Formula (1), used in the present invention are shown below. Examples are by no means limited to these.

Exemplary Compound No.

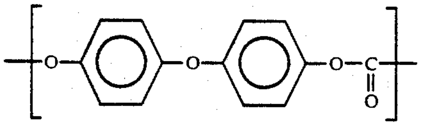
(1)

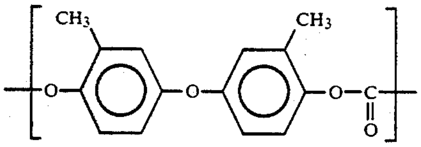
(2)

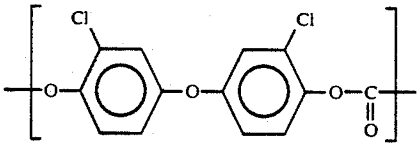
(3)

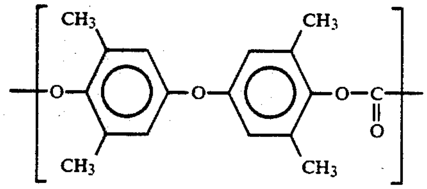
(4)

(5)
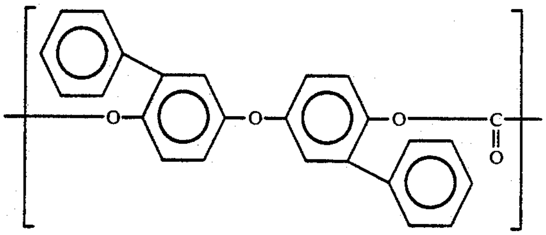

-continued

Exemplary Compound No.

(6)
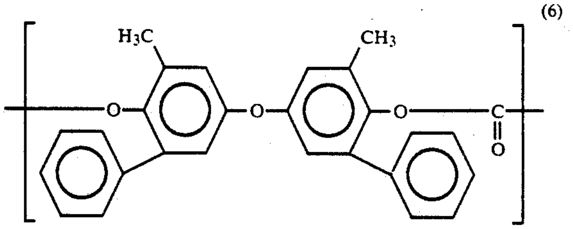

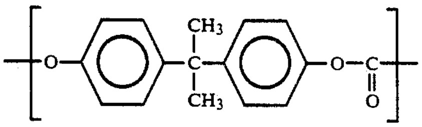
(7)

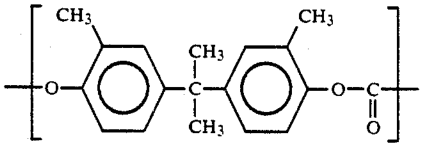
(8)

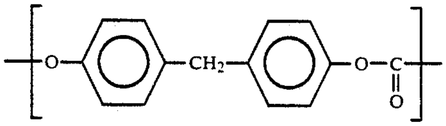
(9)

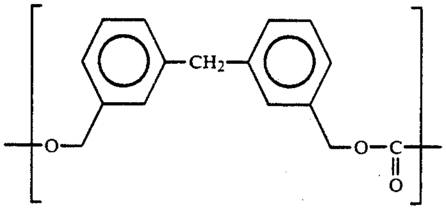
(10)

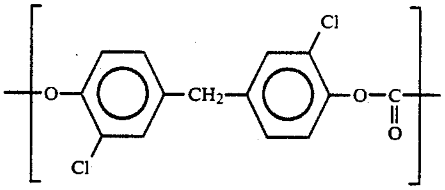
(11)

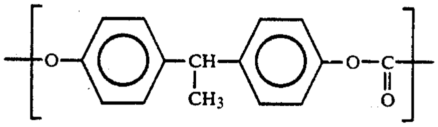
(12)

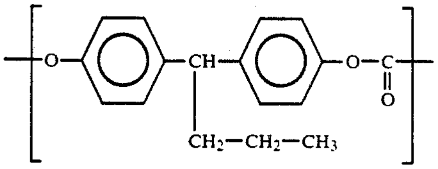
(13)

-continued

| Exemplary Compound No. |
|---|

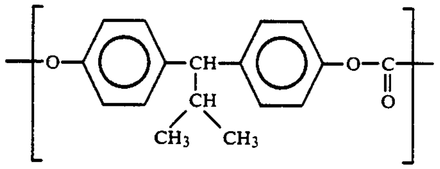
(14)

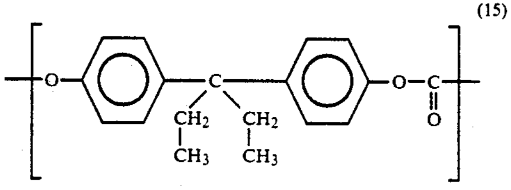
(15)

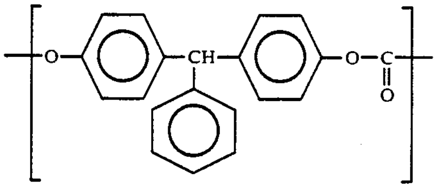
(16)

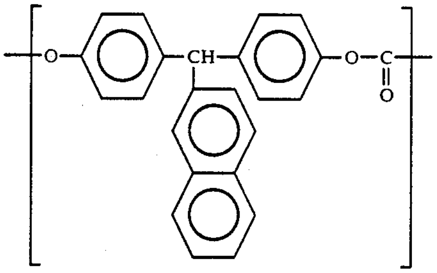
(17)

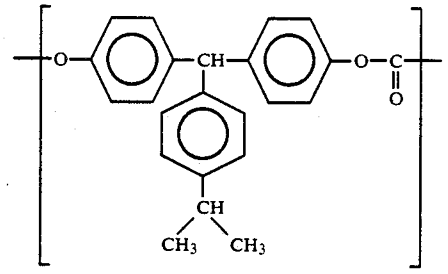
(18)

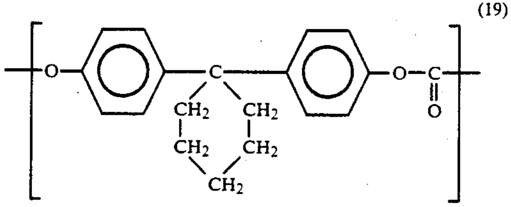
(19)

-continued

| Exemplary Compound No. |
|---|

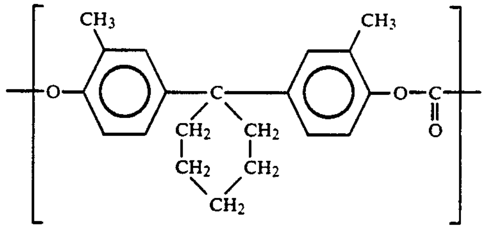
(20)

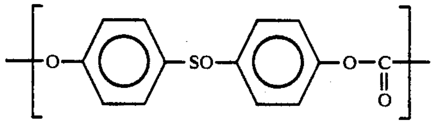
(21)

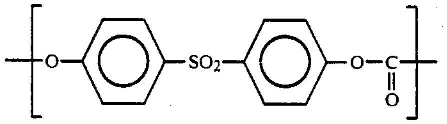
(22)

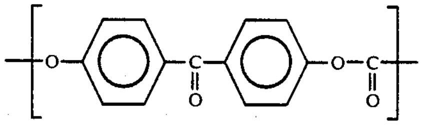
(23)

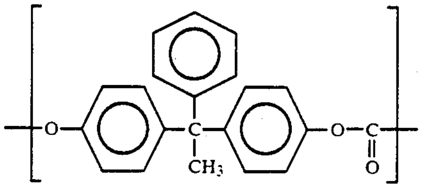
(24)

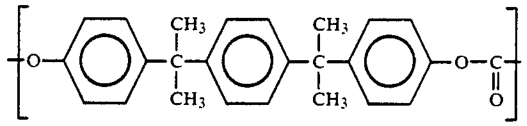
(25)

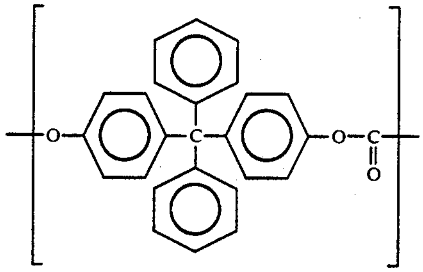
(26)

Of these component units, component units Nos. 7, 19, 20 and 25 are particularly preferred, and component unit No. 19 is more preferred.

Preferable examples of the component unit represented by Formula (2), used in the present invention may be the same as the preferable examples of the component unit represented by Formula (1) as set out in the above. Component units Nos. 7, 19, 20 and 25 are particularly preferred, and component units Nos. 7 and 20 are more preferred.

Preferable examples of the component unit represented by Formula (3), used in the present invention are shown below. Examples are by no means limited to these.

| | Exemplary Compound No. |
|---|---|
| 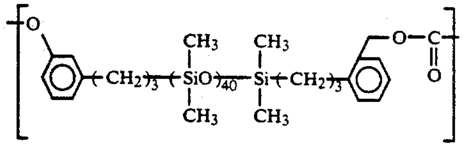 | (27) |
| 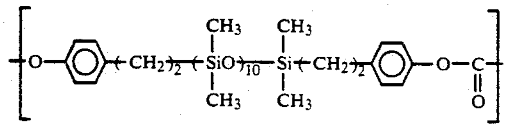 | (28) |
| 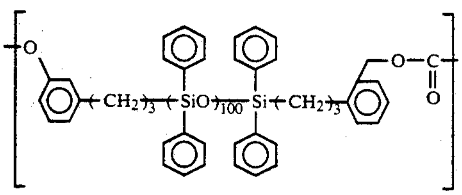 | (29) |
| 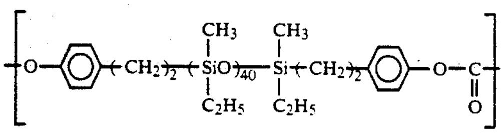 | (30) |
| 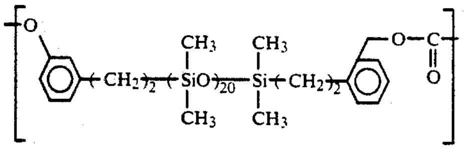 | (31) |
| 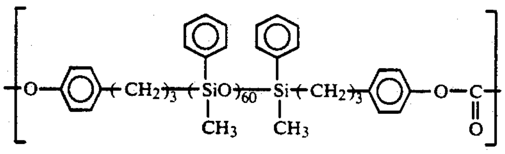 | (32) |
| 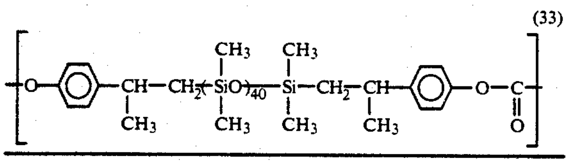 | (33) |

Of these, component unit No. 27 is particularly preferred.

The polymer having the component units represented by Formulas (2) and (3) can be obtained by interfacially polymerizing bisphenols represented by Formula (4) and Formula (5):

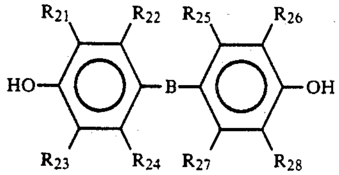 (4)

wherein B and $R_{21}$ to $R_{28}$ are as defined above;

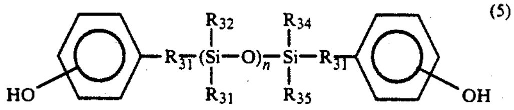 (5)

wherein $R_{31}$ to $R_{35}$ are as defined above; in the presence of a carbonate, a chloroformate or the like.

In the present invention, assuming the weight of the component unit represented by Formula (2) as $\alpha$ and the weight of the component unit represented by Formula (3) as $\beta$, a value of $\beta/(\alpha+\beta)$ may preferably range from 0.01 to 0.9, and particularly preferably from 0.01 to 0.1.

Letter symbol n in Formula (3) represents 1 to 200, and particularly preferably 5 to 100. The group represented by $R_{31}$ may include ethylene, propylene, isopropylene, butylene and pentylene, and particularly preferably ethylene, propylene and isopropylene.

The electrophotographic photosensitive member of the present invention has particularly excellent solvent cracking resistance, surface lubricity and storage stability. The reason therefor is presumably that the introduction of the polymers having the component units represented by Formulas (2) and (3 ), endows the surface layer with chemical resistance, slowing the infusion rate of any chemicals which cause the solvent cracking of the photosensitive layer, and therefore reducing the rate of the trouble occurrence in the coating film. Besides, the addition of such polymers remarkably prevents the layer separation due to the separating of low-molecular weight components added in the photosensitive layer. This is presumably because the polydimethylsiloxane skeleton of the component unit represented by Formula (3) functions also as a compatibilizer to the charge-transporting material.

The polymers contained in the surface layer of the electrophotographic photosensitive member of the present invention must be selected taking account of anti-scratch properties and hardness, and also its production stability and storage stability, required according to electrophotographic processes. The proportion of the polymer having the component unit represented by Formula (1) to the polymers having the component units represented by Formulas (2) and (3) must be controlled taking account of the solvent cracking resistance, the durability, and environmental stability of electrical characteristics and the production stability, that depends on solution stability. The polymers having the component units represented by Formulas (2) and (3) may preferably be in the range of from 0.1 to 95% by weight, and particularly preferably from 0.5 to 80% by weight, on the basis of the weight of the polymer having the component unit represented by Formula (1). In particular, in the case when the value of $\beta/(\alpha+\beta)$ ($\alpha$ is the weight of the component unit represented by Formula (2) and $\beta$ is the component unit represented by Formula (3)) ranges from 0.01 to 0.1, the above proportion of the polymers may preferably be in the range of from 1 to 15% by weight, and particularly preferably from 3 to 10% by weight.

In the electrophotographic photosensitive member of the present invention, the photosensitive layer may be a so-called single layer type in which a charge-generating material and a charge-transporting material are contained in the same layer, or a lamination type in which a charge generation layer containing a charge-generating material and a charge transport layer containing a charge-transporting material are laminated. In order to satisfy the performances required for the electrophotographic photosensitive member, the latter lamination type is preferable.

The charge-generating material used in the photosensitive member of the present invention may include selenium-tellurium, pyrylium or thiopyrylium type dyes and all sorts of central metal and crystal types, specifically including, for example, phthalocyanine compounds having crystal forms such as $\alpha$, $\beta$, $\gamma$, $\epsilon$ and X types, anthanthrone pigments, dibenzpyrenequinone pigments, pyranthrone pigments, trisazo pigments, disazo pigments, azo pigments, indigo pigments, quinacridone pigments, unsymmetrical quinocyanine pigments, quinocyanine pigments, and amorphous silicon compounds as disclosed in Japnese Laid-Open Patent Application No. 54-143645. In the case of the lamination type (or function-separated type), the charge generation layer can be formed by vacuum deposition of the aforesaid charge-generating material on a conductive support, or by coating a dispersion comprising the charge-generating material dispersed together with 0.3- to 4-fold amount of binder resin and solvent by means of a homogenizer, an ultrasonic dispersion machine, a ball mill, a vibration ball mill, a sand mill, an attritor, a roll mill or the like, followed by drying. The charge generation layer thus formed may preferably have a thickness of 5 $\mu$m or less, and particularly in the range of from 0.1 to 2 $\mu$m.

The charge-transporting material may include pyrene, N-ethylcarbazole, N-isopropylcarbazole, N-methyl-N-phenylhydrazino-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine, hydrazones such as p-diethylaminobenzaldehyde-N,N-diphenylhydrazone, p-diethylaminobenzaldehyde-N-$\alpha$-naphthyl-N-phenylhydrazone, p-pyrrolinodibenzaldehyde-N,N-diphenylhydrazone, 1,3,3-trimethylindolenine-$\omega$-aldehyde-N,N-diphenylhydrazone and p-diethylbenzaldehyde-3-methylbenzthiazolinone-2-hydrazone, 2,5-bis(p-diethylaminophenyl)-1,3,4-oxadiazole, pyrazolines such as 1-phenyl-3-(p-diethylaminostyryl)-5-(p-diethylaminoethyl)pyrazoline, 1-[quinolyl(2)]-3-)p-diethylaminostyryl)-5-(p-diethylaminophenyl)pyrazoline, 1-[pyridyl(2)]-3-(p-diethylaminostyryl)-5-(p-diethylaminophenyl) pyrazoline, 1-[6-methoxy-pyridyl(2)]-3-(p-diethylaminostyryl)-5-(p-diethylaminostyryl) pyrazoline, 1-[pyridyl(3)]-3-(p-diethylaminostyryl)-5-(p-diethylaminophenyl)pyrazoline, 1-[pyridyl(2)]-3-(p-diethylaminostyryl)-5-(p-diethylaminophenyl) pyrazoline, 1-[pyridyl(2)]-3-(p-diethylaminostyryl)-4-methyl-5-(p-diethylaminophenyl)-pyrazoline, 1-[pyridyl(2)]-3-($\alpha$-methyl-p-diethylaminostyryl)-5-(p-diethylaminophenyl)pyrazoline; 1-phenyl-3-(p-diethylaminostyryl)-4-methyl-5-(p-diethylaminophenyl) pyrazoline, 1-phenyl-3-($\alpha$-benzyl-p-diethylaminostyryl)-5-(p-diethylaminophenyl)pyrazoline and spiropyrazoline, oxazole compounds such as 2-(p-diethylaminostyryl)-6-diethylaminobenzoxazole, and 2-(p-diethylaminophenyl)-4-(p-diethylaminophenyl)-5-(2-chlorophenyl)oxazole, thiazole compounds such as 2-(p-diethylaminostyryl)-6-diethylaminobenzothiazole, triarylmethane compounds such as bis(4-diethylamino-2-methylphenyl) phenylmethane, and polyarylalkanes such as 1,1-bis(4-N,N-diethylamino-2-methylphenyl)-heptane and 1,1,2,2-tetrakis-4-N,N-dimethylamino-2-methylphenyl)ethane.

The charge transport layer can be formed by coating a solution prepared by dissolving the above charge-transporting material and a binder resin in a solvent, followed by drying. The charge-transporting material and the binder resin may preferably be mixed in a proportion of from 2:1 to 1:2. The charge transport layer may preferably have a layer thickness of from 5 to 40 $\mu$m, and particularly preferably from 15 to 30 $\mu$m.

Where the photosensitive layer is of the single layer type, it can be formed by coating a solution prepared by dispersing and incorporating the charge-generating material and charge-transporting material as described above in a binder resin using a suitable solvent, followed by drying.

As the binder resin used in these layers, the copolymers of the present invention are used when the photosensitive layer is the surface layer. When it is not the surface layer, polyvinyl butyral, polyvinyl benzal, polyallylate, polycarbonate, polyester, phenoxy resin, cellulose resin, acrylic resin, polyurethane or the like may be used in the charge generation layer, and acrylic resin, polyallylate, polyester, polycarbonate, polystyrene, acrylonitrilestyrene copolymer, polyacrylamide, polyamide, chlorinated rubber or the like may be used in the charge transport layer.

In the present invention, the surface layer of the present invention may be used as a surface protective layer provided on the photosensitive layer. When the surface layer of the present invention is used as a surface protective layer, a conductive powder such as tin oxide, indium oxide, ITO and titanium oxide or a mixture of any of these, or a charge-transporting material may be added to provide electrical characteristics according to the electrophotographic processes applied. It may preferably be added in an amount of from 1% by weight to 50% by weight based on the total weight of the surface protective layer. A lubricant such as Teflon particles may be further added to the surface protective layer.

The conductive support used in the present invention may be a metal such as aluminum, an aluminum alloy, copper, zinc, stainless steel, vanadium, molybdenum, chromium, titanium, nickel, indium, gold or platinum. The support may also be a plastic material as exemplified by polyethylene, polypropylene, polyvinyl chloride, polyethylene terephthalate or acrylic resin provided thereon with a coating formed by vacuum deposition of such a metal or alloy, or may be a plastic, metal or alloy substrate coated thereon with conductive particles as exemplified by carbon black or silver particles together with a suitable binder resin or it may be paper or plastic containing conductive particles by soak treatment. The support may be of any form including a drum, a sheet and a belt, and may preferably have the form most suited for the electrophotographic apparatus used.

In the present invention, a subbing layer having a barrier function and an adhesive function may be provided on the conductive support. The subbing layer is formed for the purposes of improving the adhesion of the photosensitive layer, improving coating properties, protecting the support, covering any faults on the support, improving charge injection from the support and protecting the photosensitive layer from its electrical breakdown. Materials for the subbing layer include polyvinyl alcohol, poly-N-vinylimidazole, polyethylene oxide, ethyl cellulose, ethylene-acrylate copolymer, casein, polyamide, copolymer nylon, glue and gelatin. The subbing layer can be formed by coating the support with a solution of any of these materials in a proper solvent, followed by drying. It may preferably have a thickness of from about 0.1 to 2 μm.

The electrophotographic photosensitive member of the present invention can be utilized not only in electrophotographic copying machines but also in the various fields of applied electrophotography such as facsimile machines, laser beam printers, CRT printers, LED printers, liquid crystal printers and laser lithographers.

FIG. 1 schematically illustrates the structure of an electrophotographic apparatus in which the photosensitive member of the present invention is used.

In FIG. 1, reference numeral 1 denotes a drum type photosensitive member serving as an image bearing member, which is rotated around a shaft *1a* at a given peripheral speed in the direction shown by the arrow. In the course of rotation, the photosensitive member 1 is uniformly charged on its peripheral surface, with positive or negative given potential by the operation of a charging means 2, and then photoimagewise exposed to light L (slit exposure, laser beam scanning exposure, etc.) at an exposure zone 3 by the operation of an imagewise exposure means (not shown). As a result, electrostatic latent images corresponding to the exposure images are successively formed on the periphery of the photosensitive member.

The electrostatic latent images thus formed are subsequently developed with a toner by the operation of a developing means 4. The resulting toner-developed images are then transferred by the operation of a transfer means 5, to the surface of a transfer medium P fed from a paper feed section (not shown) between the photosensitive member 1 and the transfer means 5 synchronizedly with the rotation of the photosensitive member 1.

The transfer medium P on which an image has been transferred is separated from the surface of the photosensitive member and led through an image-fixing means 8, where the image is fixed and then delivered to the outside as a transcript (a copy).

After the transfer of the image, the surface of the photosensitive member 1 is cleaned with a cleaning means 6 to remove the residual untransferred toner and further subjected to charge elimination by a pre-exposure means 7, and is then ready for repeating use for image formation.

As the charging means 2, corona assemblies are commonly used. As the transfer means 5, corona transfer assemblies are also used. In the present invention, the electrophotographic apparatus may be constituted of a combination of plural components joined as one device unit such as the above photosensitive member, developing means and cleaning means so that the unit is easily removable from the body of the apparatus. For example, the photosensitive member 1 and at least one of the charging means, developing means and cleaning means may be joined into one device unit to make the unit removable using a guide means such as rails provided in the body of the apparatus. Here, the above device unit may be constructed together with the charging means and/or the developing means.

When the electrophotographic apparatus is used as a copying machine or a printer, the photosensitive member is exposed to optical image exposing light L, which is the light reflected from, or transmitted through an original, or otherwise the light projected by scanning a laser beam, driving an LED array or a liquid crystal shutter array according to signals obtained by reading an original with a sensor and converting the information into signals.

Figure 2:
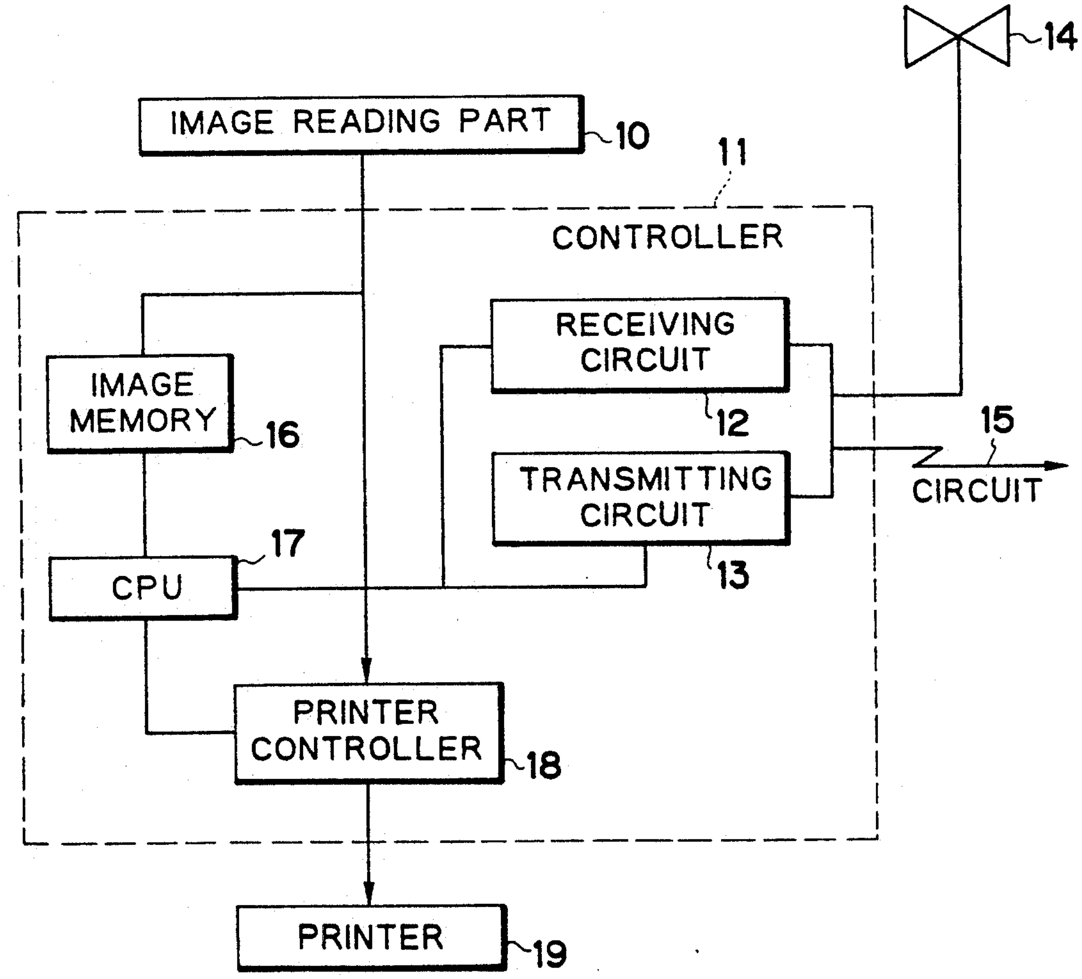
FIG. 2 is a block diagram of the facsimile machine having the electrophotographic photosensitive member of the present invention.

When used as the printer of a facsimile machine, the optical image exposing light L is for the printing of received data. FIG. 2 illustrates an example thereof in the form of a block diagram.

As shown in FIG. 2, a controller 11 controls an image reading part 10 and a printer 19. The whole of the controller 11 is controlled by CPU 17. Image data from the image reading part is sent to the other station through a transmitting circuit 13. Data received from the other station is sent to a printer 19 through a receiving circuit 12. Given image data are stored in an image memory 16. A printer controller 18 controls the printer 19. The numeral 14 denotes a telephone.

The image received through a circuit 15 (image information from a remote terminal connected through the circuit) is demodulated in the receiving circuit 12, and then successively stored in an image memory 16 after the image information is decoded by the CPU 17. Then, when images for at least one page have been stored in the memory 16, the image recording for that page is carried out. The CPU 17 reads out the image information for one page from the memory 16 and sends the decoded image information to the printer controller 18. The printer controller 18, on receiving the image information for one page from the CPU 17, controls the printer 19 so that the image information for one page is recorded.

The CPU 17 receives image information for next page in the course of the recording by the printer 19.

Images are received and recorded in this way.

The present invention will be described below in greater detail by giving Examples.

EXAMPLE 1

In a sand mill, 50 parts (parts by weight; the same applies hereinafter) of conductive titanium oxide powder whose particle surfaces were coated with tin oxide containing 10% of antimony oxide, 25 parts of phenol resin, 20 parts of methyl cellosolve, 5 parts of methanol and 0.002 part of silicone oil (a polydimethylsiloxane-polyoxyalkylene copolymer; weight average molecular weight: 3,000) were dispersed with glass beads of 1 mm in diameter for 2 hours to give a conductive layer coating composition. This coating composition was applied onto an aluminum cylinder of 30 mm in diameter by dip coating, followed by drying at 140° C. for 30 minutes to form a conductive layer 20 μm thick.

Next, 5 parts of N-methoxymethylated nylon was dissolved in 95 parts of methanol to give a subbing layer coating composition. This coating composition was applied onto the above conductive layer by dip coating, followed by drying at 100° C. for 20 minutes to form a subbing layer of 0.6 μm thick.

Subsequently, in a sand mill, 3 parts of oxytitanium phthalocyanine whose X-ray diffraction of CuK-α has strong peaks at a Bragg angle ($2\theta \pm 0.2°$) of 9.0°, 14.2°, 23.9° and 27.1° for in X-ray diffraction, 2 parts of polyvinyl butyral resin (S-LEC BM2; available from Sekisui Chemical Co., Ltd.) and 35 parts of cyclohexanone were dispersed with glass beads of 1 mm in diameter for 2 hours, followed by addition of 60 parts of ethyl acetate to give a dispersion for the charge generation layer. This dispersion was applied on the above subbing layer by dip coating, dried at 100° C. for 15 minutes to form a charge generation layer with a layer thickness of 0.2 μm.

Next, 8 parts of a compound represented by the formula:

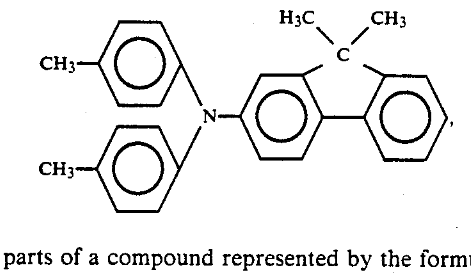

2 parts of a compound represented by the formula:

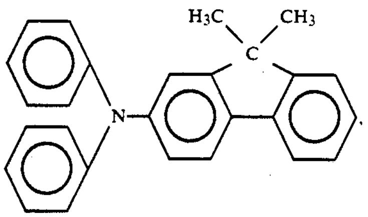

9 parts of a polymer (viscosity average molecular weight: $2.05 \times 10^4$) comprised of a component unit represented by the formula:

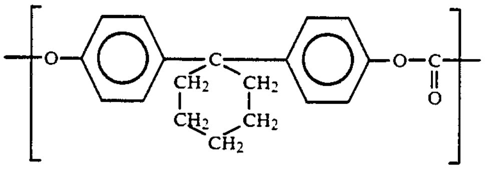

and 1 part of a copolymer (viscosity average molecular weight: $2.05 \times 10^4$) which was a copolymer comprised of component units represented by the formulas (a) and (b):

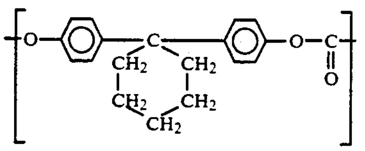

(a)

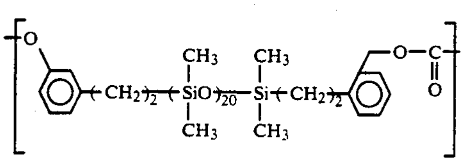

(b)

in which the component (a) held 95% by weight of the total weight of the copolymer, were dissolved in a mixed solvent comprised of 20 parts of dichloromethane and 40 parts of monochlorobenzene. The resulting solution was applied on the above charge generation layer by dip coating, dried at 120° C. for 60 minutes to form a charge transport layer with a layer thickness of 23 μm.

The surface lubricity, the separation of low-molecular weight component with time, and solvent cracking of the resulting electrophotographic photosensitive member were evaluated. To evaluate the surface lubricity, a urethane rubber cleaning blade used for copying machines was brought into contact with the surface of the photosensitive member at an angle of 30° and the resistance to slip of the blade was measured using a HEIDON-14 type surface property tester (manufactured by Shinto Kagaku K.K.). Subsequently, with the urethane rubber cleaning blade brought into pressure contact to the surface, the photosensitive member was stored at 75° C. for 2 weeks to make an accelerated test for the separation of low-molecular weight components, and the surface of the photosensitive member was observed with a microscope to examine whether the low-molecular weight components have separated out. For the estimation of the solvent cracking resistance, finger sebum was adhered to the surface layer and the photosensitive member was left to stand for 24 hours or 2 days in an environment of normal temperature and normal humidity to thereafter examine whether or not solvent cracking occurred. This photosensitive member was further left to stand for 24 hours in an environment of 40° C. and 93% RH and thereafter set in a copying machine LBP-LX, manufactured by Canon Inc. A running test with 5,000 sheet continuous paper feed was carried to examine the presence of black spots due to adhered toner on the surface of the photosensitive member.

Results obtained are shown in Table 2.

EXAMPLES 2 TO 20

Photosensitive members were produced in the same manner as in Example 1 except that the weight ratio of the component unit represented by the formula:

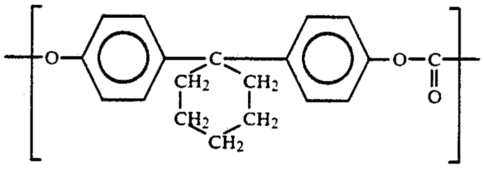

and the part(s) by weight of the copolymer were changed as shown in Table 1. Evaluation was made similarly.

Results obtained are shown in Table 2.

TABLE I

| Example | Weight ratio | Part(s) by weight |
|---|---|---|
| 2 | 99 | 1 |
| 3 | 90 | 1 |
| 4 | 80 | 1 |
| 5 | 50 | 1 |
| 6 | 95 | 0.5 |
| 7 | 90 | 0.5 |
| 8 | 65 | 0.5 |
| 9 | 99 | 0.1 |
| 10 | 90 | 0.1 |
| 11 | 50 | 0.1 |
| 12 | 99 | 3 |
| 13 | 90 | 3 |
| 14 | 80 | 3 |

TABLE I-continued

| Example | Weight ratio | Part(s) by weight |
|---|---|---|
| 15 | 99 | 9 |
| 16 | 90 | 9 |
| 17 | 99 | 30 |
| 18 | 95 | 30 |
| 19 | 99 | 0.05 |
| 20 | 90 | 0.05 |

TABLE 2

| Example | Surface lubricity; mV/10 g load | Occurrence of separation | Black spots *1 | Solvent cracking resistance *2 24 hrs | Solvent cracking resistance *2 2 days |
|---|---|---|---|---|---|
| 1 | 300 | None | None | AA | AA |
| 2 | 370 | " | " | AA | AA |
| 3 | 240 | " | " | AA | AA |
| 4 | 200 | " | 4,000 sheets | AA | A |
| 5 | 195 | " | 3,700 sheets | AA | A |
| 6 | 310 | " | None | AA | AA |
| 7 | 330 | " | " | AA | AA |
| 8 | 315 | " | " | A | A |
| 9 | 395 | " | " | AA | AA |
| 10 | 300 | " | " | AA | AA |
| 11 | 280 | " | 4,300 sheets | A | A |
| 12 | 270 | " | 4,700 sheets | A | A |
| 13 | 265 | " | 4,300 sheets | A | A |
| 14 | 210 | " | 3,900 sheets | A | A |
| 15 | 190 | " | 3,900 sheets | A | B |
| 16 | 195 | " | 3,500 sheets | A | B |
| 17 | 200 | " | 3,800 sheets | A | B |
| 18 | 190 | " | 3,400 sheets | A | B |
| 19 | 395 | " | 4,800 sheets | A | B |
| 20 | 400 | " | Unconfirmed | A | B |

*1 The number of the first sheet on which 5 or more black spots of 0.5 mm or more in diameter are recognized within one rotation of the photosensitive member.
*2 AA: No cracking.
A: Three or less minute cracks are recognized when observed with a microscope of 200 magnifications, but there is no influence on images.
B: Ten or less minute cracks are recognized when observed with a microscope of 200 magnifications, but there is no influence on images.
C: Ten or more of 0.5 mm or larger cracks are recognized when observed with a microscope of 200 magnifications, and there is an influence on images.
D: Countless cracks of 0.5 mm or larger are recognized when observed with a microscope of 200 magnifications, and there is a serious influence on images.

EXAMPLE 21

The conductive layer and subbing layer on the aluminum cylinder were formed as in Example 1.

Next, in a sand mill, 3 parts of disazo pigment represented by the formula:

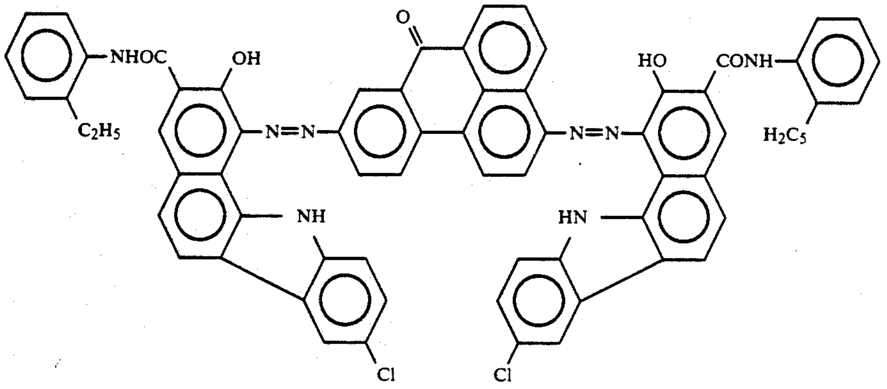

2 parts of polyvinyl benzal (degree of benzalation: 80%; weight average molecular weight: 11,000) and 35 parts of cyclohexanone were dispersed for 12 hours with glass beads of 1 mm in diameter, followed by addition of 60 parts of methyl ethyl ketone to give a dispersion for charge generation layer. This dispersion was applied on the above subbing layer by dip coating, followed by drying at 80° C. for 20 minutes to form a charge generation layer with a layer thickness of 0.2 μm.

Next, 10 parts of a compound represented by the formula:

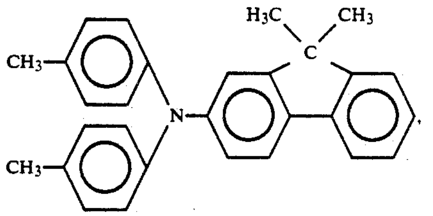

5 parts of a polymer (viscosity average molecular weight: $2.05\times10^4$) comprised of a component unit represented by the formula:

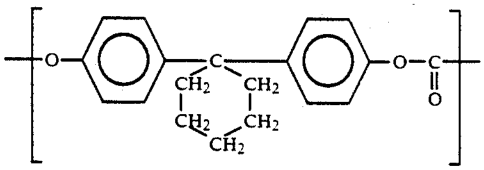

and 5 parts of a copolymer (viscosity average molecular weight: $2.21\times10^4$) which was a copolymer comprised of component units represented by the formulas (c) and (d):

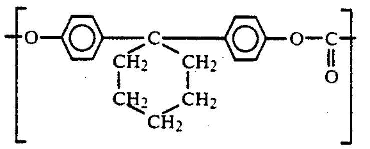
(c)

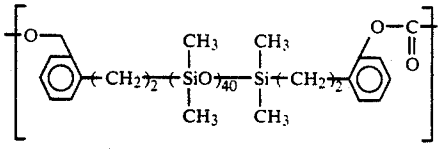
(d)

in which the component (c) held 95% by weight of the total weight of the copolymer, were dissolved in a mixed solvent comprised of 20 parts of dichloromethane and 40 parts of monochlorobenzene. The resulting solution was applied on the above charge generation layer in the same manner as in Example 1, followed by drying at 120° C. for 60 minutes to form a charge transport layer with a layer thickness of 23 μm.

The photosensitive member thus obtained was evaluated in the same manner as in Example 1.

Results obtained are shown in Table 3.

EXAMPLE 22

The conductive layer, subbing layer and charge generation layer were formed on the aluminum cylinder as in Example 1.

Next, a charge transport layer was formed in the same manner as in Example 1 except for the resins used, which were 8 parts of a polymer (viscosity average molecular weight: $8.56\times10^4$) comprised of a component unit represented by the formula:

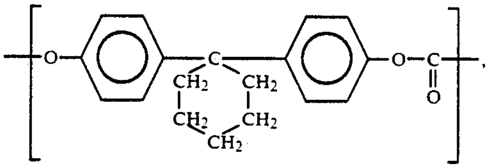

and 2 parts of a copolymer (viscosity average molecular weight: $2.25\times10^4$) comprised of component units represented by the formulas (e) and (f):

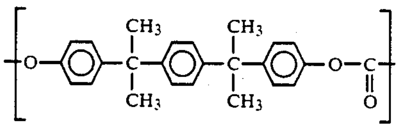

(e)

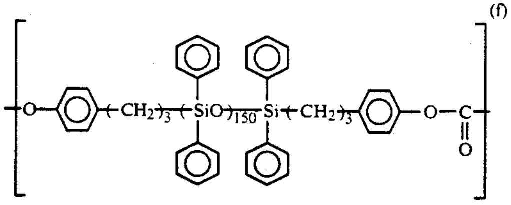

(f)

in which the component (e) held 99% by weight of the total weight of the copolymer. The photosensitive member thus obtained was evaluated in the same manner as in Example 1.

Results obtained are shown in Table 3.

EXAMPLE 23

The conductive layer, subbing layer and charge generation layer were formed on the aluminum cylinder as in Example 1.

Next, a charge transport layer was formed in the same manner as in Example 1 except for the resins used, which were 2 parts of a polymer (viscosity average molecular weight: $3.31\times10^4$) comprised of a component unit represented by the formula:

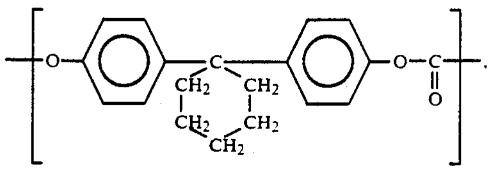

and 8 parts of a copolymer (viscosity average molecular weight: $2.25\times10^4$) comprised of component units represented by the formulas (g) and (h):

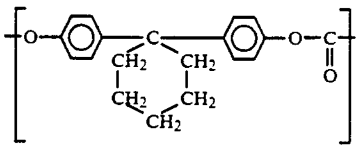

(g)

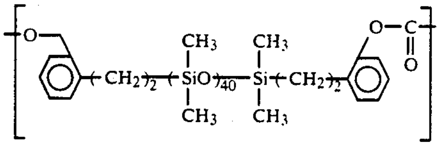

(h)

in which the component (g) held 90% by weight of the total weight of the copolymer. The photosensitive member thus obtained was evaluated in the same manner as in Example 1.

Results obtained are shown in Table 3.

EXAMPLE 24

The conductive layer, subbing layer and charge generation layer were formed on the aluminum cylinder as in Example 1.

Next, a charge transport layer was formed in the same manner as in Example 1 except for the resins used, which were 5 parts of a polymer (viscosity average molecular weight: $3.01\times10^4$) comprised of a component unit represented by the formula:

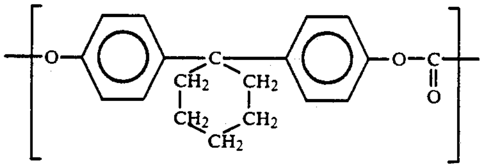

and 5 parts of a copolymer (viscosity average molecular weight: $3.13\times10^4$) comprised of component units represented by the formulas (i) and (j):

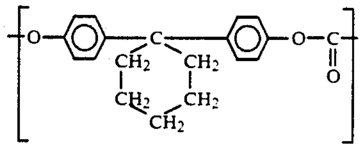

(i)

-continued

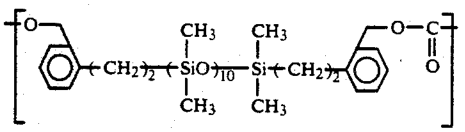

(j)

in which the component (i) held 95% by weight of the total weight of the copolymer. The photosensitive member thus obtained was evaluated in the same manner as in Example 1.

Results obtained are shown in Table 3.

EXAMPLE 25

The conductive layer, subbing layer and charge generation layer were formed on the aluminum cylinder as in Example 1.

Next, a charge transport layer was formed in the same manner as in Example 1 except the charge-transporting material was 10 parts of a compound represented by the formula:

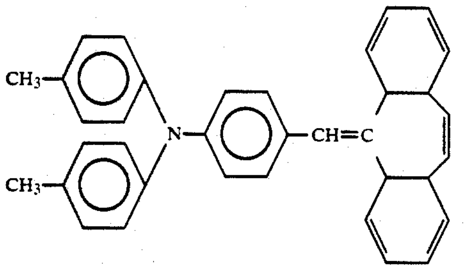

and as the resins 5 parts of a polymer (viscosity average molecular weight: $2.53\times10^4$) comprised of a component unit represented by the formula:

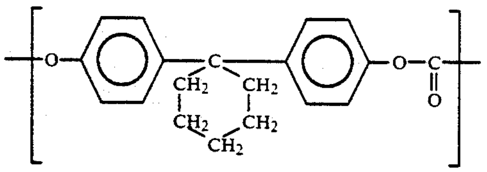

and 5 parts of a copolymer (viscosity average molecular weight: $3.25\times10^4$) comprised of component units represented by the formulas (k) and (l):

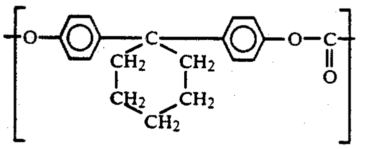

(k)

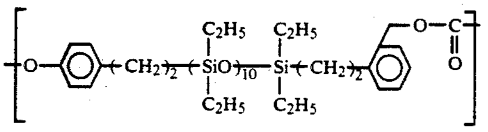

(l)

in which the component (k) held 95% by weight of the total weight of the copolymer. The photosensitive member thus obtained was evaluated in the same manner as in Example 1.

Results obtained are shown in Table 3.

COMPARATIVE EXAMPLE

Example 1 was repeated to produce a photosensitive member except that the charge transport layer was formed using 10 parts of polycarbonate-Z (viscosity average molecular weight: $1.92\times10^4$) as the resin. Evaluation was made similarly.

Results obtained are shown in Table 3.

TABLE 3

| | Surface lubricity; mV/10 g load | Occurrence of separation | Black spots *1 | Solvent cracking resistance *2 24 hrs | 2 days |
|---|---|---|---|---|---|
| Example: | | | | | |
| 21 | 100 | None | 4,200 sheets | A | B |
| 22 | 105 | " | 4,800 sheets | AA | A |
| 23 | 100 | " | 3,700 sheets | A | B |
| 24 | 150 | " | 4,500 sheets | A | B |
| 25 | 140 | " | 4,800 sheets | A | B |
| Comparative Example | | | | | |
| 1 | 3,500 | Occurred after 7 days | 3,000 sheets | D | D |

Symbols AA, A, B, C and DD are as noted in Table 2.

What is claimed is:

1. An electrophotographic photosensitive member comprising a conductive support and a photosensitive layer provided thereon, wherein the surface layer of said electrophotographic photosensitive member contains a polymer having a component unit represented by the following Formula (1) and a polymer having a component unit represented by the following Formula (2) and a component unit represented by the following Formula (3)

Formula (1):

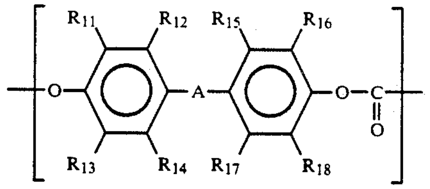

(1)

wherein A is a straight-chain, branched or cyclic alkylidene group having 1 to 15 carbon atoms, an aryl-substituted alkylidene group, an arylenedialkylidene group, or —O—, —S—, —CO—, —SO— or —$SO_2$—; and $R_{11}$ to $R_{18}$ each is a hydrogen atom, a halogen atom, an alkyl group having 1 to 4 carbon atoms, an alkenyl group having 2 to 4 carbons, or an aryl group Formula (2):

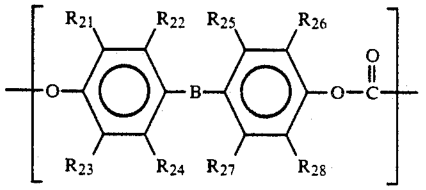

(2)

wherein B is a straight-chain, branched or cyclic alkylidene group having 1 to 10 carbon atoms, an aryl-substituted alkylidene group, an arylenedialkylidene group, or —O—, —S—, —CO—, —SO— or —$SO_2$—; and $R_{21}$ to $R_{28}$ each is a hydrogen atom, a halogen atom, an alkyl group having 1 to 4 carbon atoms or an alkenyl group having 2 to 4 carbons Formula (3):

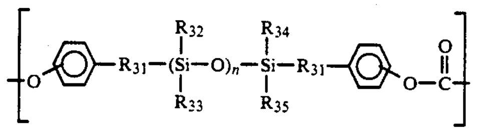

(3)

wherein $R_{31}$ is an alkylene group or alkylidene group having 2 to 6 carbon atoms; $R_{32}$ to $R_{35}$ each is an alkyl group having 1 to 3 carbon atoms, a phenyl group or a substituted phenyl group; and n represents an integer of 1 to 200.

2. The electrophotographic photosensitive member according to claim 1, wherein said component unit represented by Formula (1) is a unit represented by the formula:

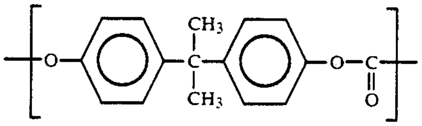

3. The electrophotographic photosensitive member according to claim 1, wherein said component unit represented by Formula (1) is a unit represented by the formula:

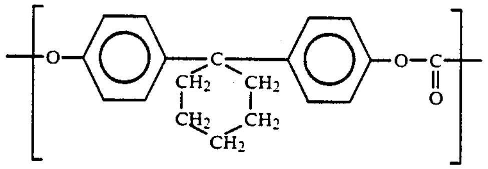

4. The electrophotographic photosensitive member according to claim 1, wherein said component unit represented by Formula (1) is a unit represented by the formula:

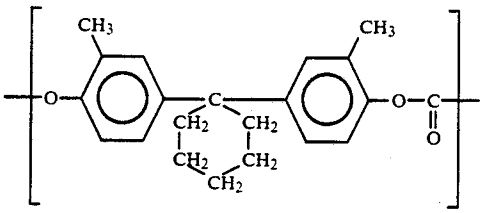

5. The electrophotographic photosensitive member according to claim 1, wherein said component unit represented by Formula (1) is a unit represented by the formula:

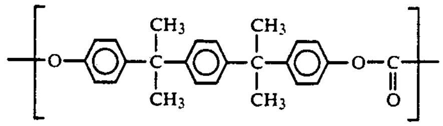

6. The electrophotographic photosensitive member according to claim 1, wherein said component unit represented by Formula (2) is a unit represented by the formula:

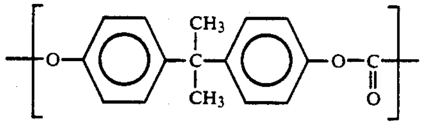

7. The electrophotographic photosensitive member according to claim 1, wherein said component unit represented by Formula (2) is a unit represented by the formula:

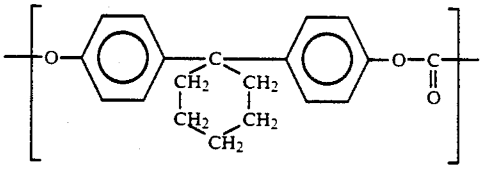

8. The electrophotographic photosensitive member according to claim 1, wherein said component unit represented by Formula (2) is a unit represented by the formula:

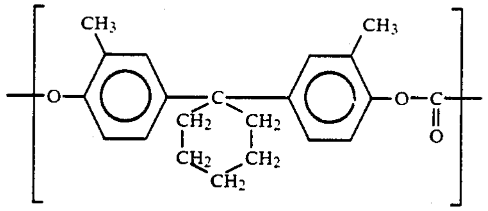

9. The electrophotographic photosensitive member according to claim 1, wherein said component unit represented by Formula (2) is a unit represented by the formula:

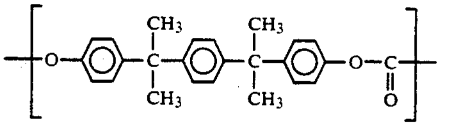

10. The electrophotographic photosensitive member according to claim 1, wherein $R_{31}$ in Formula (3) is an ethylene group, a trimethylene group, an propylene group, a tetramethylene group or a pentomethylene group.

11. The electrophotographic photosensitive member according to claim 1, wherein $R_{31}$ in Formula (3) is an ethylene group, a trimethylene group or a propylene group.

12. The electrophotographic photosensitive member according to claim 1, wherein n in Formula (3) represents an integer of 1 to 100.

13. The electrophotographic photosensitive member according to claim 1, wherein said component unit represented by Formula (3) is a unit represented by the formula:

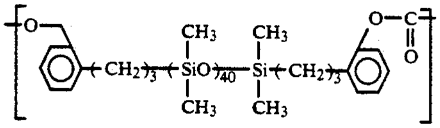

14. The electrophotographic photosensitive member according to claim 1, wherein weight $\alpha$ of the component unit represented by Formula (2) and weight $\beta$ of the component unit represented by Formula (3) satisfy the following expression.

$$0.01 \leqq \beta/(\alpha+\beta) \leqq 0.9$$

15. The electrophotographic photosensitive member according to claim 14, wherein weight $\alpha$ of the component unit represented by Formula (2) and weight $\beta$ of the component unit represented by Formula (3) satisfy the following expression.

$$0.01 \leqq \beta/(\alpha+\beta) \leqq 0.1$$

16. The electrophotographic photosensitive member according to claim 15, wherein a copolymer having the component units represented by Formulas (2) and (3) holds 1 to 15% by weight of the weight of the polymer having the component unit represented by Formula (1).

17. The electrophotographic photosensitive member according to claim 15, wherein a copolymer having the component units represented by Formulas (2) and (3) holds 3 to 10% by weight of the weight of the polymer having the component unit represented by Formula (1).

18. The electrophotographic photosensitive member according to claim 1, wherein said surface layer is the photosensitive layer.

19. The electrophotographic photosensitive member according to claim 18, wherein said photosensitive layer comprises a charge generation layer and a charge transport layer.

20. The electrophotographic photosensitive member according to claim 19, wherein said charge transport layer is the surface layer.

21. The electrophotographic photosensitive member according to claim 19, wherein said charge generation layer is the surface layer.

22. The electrophotographic photosensitive member according to claim 18, wherein said photosensitive layer is of a single layer type.

23. The electrophotographic photosensitive member according to claim 1, wherein said surface layer is a surface protective layer.

24. The electrophotographic photosensitive member according to claim 1, wherein said electrophotographic photosensitive member has a subbing layer between said conductive support and said photosensitive layer.

25. An electrophotographic apparatus comprising an electrophotographic photosensitive member, an electrostatic latent image forming means, a means for developing the electrostatic latent image formed, and a means for transferring the developed image to a transfer medium;

said electrophotographic photosensitive member comprising a conductive support and a photosensitive layer provided thereon, wherein the surface layer of said electrophotographic photosensitive member contains a polymer having a component unit represented by the following Formula (1) and a polymer having a component unit represented by the following Formula (2) and a component unit represented by the following Formula (3)

Formula (1):

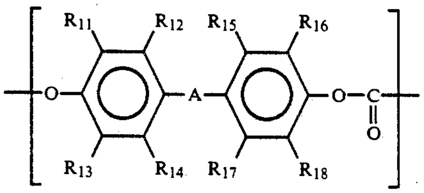

(1)

wherein A is a straight-chain, branched or cyclic alkylidene group having 1 to 15 carbon atoms, an aryl-substituted alkylidene group, an arylenedialkylidene group, or —O—, —S—, —CO—, —SO— or $—SO_2—$; and $R_{11}$ to $R_{18}$ each is a hydrogen atom, a halogen atom, an alkyl group having 1 to 4 carbon atoms, an alkenyl group having 2 to 4 carbons, or an aryl group Formula (2):

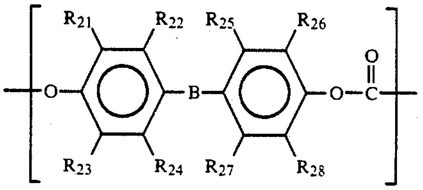

(2)

wherein B is a straight-chain, branched or cyclic alkylidene group having 1 to 10 carbon atoms, an aryl-substituted alkylidene group, an arylenedialkylidene group, or —O—, —S—, —CO—, —SO— or $—SO_2—$; and $R_{21}$ to $R_{28}$ each is a hydrogen atom, a halogen atom, an alkyl group having 1 to 4 carbon atoms or an alkenyl group having 2 to 4 carbons Formula (3):

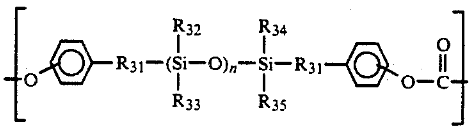

(3)

wherein $R_{31}$ is an alkylene group or alkylidene group having 2 to 6 carbon atoms; $R_{32}$ to $R_{35}$ each is an alkyl group having 1 to 3 carbon atoms, a phenyl group or a substituted phenyl group; and n represents an integer of 1 to 200.

26. A device unit comprising an electrophotographic photosensitive member and at least one means selected from the group consisting of a charging means, a developing means and a cleaning means:

said electrophotographic photosensitive member comprising a conductive support and a photosensitive layer provided thereon, wherein the surface layer of said electrophotographic photosensitive member contains a polymer having a component unit represented by the following Formula (1) and a polymer having a component unit represented by the following Formula (2) and a component unit represented by the following Formula (3)

Formula (1):

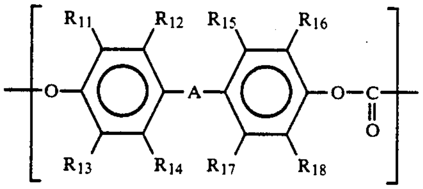

(1)

wherein A is a straight-chain, branched or cyclic alkylidene group having 1 to 15 carbon atoms, an aryl-substituted alkylidene group, an arylenedialkylidene group, or —O—, —S—, —CO—, —SO— or $—SO_2—$; and $R_{11}$ to $R_{18}$ each is a hydrogen atom, a halogen atom, an alkyl group having 1 to 4 carbon atoms, an alkenyl group having 2 to 4 carbons or an aryl group Formula (2):

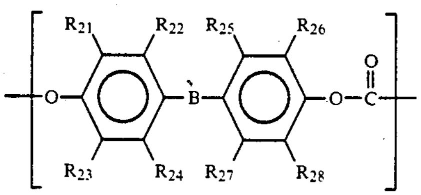

(2)

wherein B is a straight-chain, branched or cyclic alkylidene group having 1 to 10 carbon atoms, an aryl-substituted alkylidene group, an arylenedialkylidene group, or —O—, —S—, —CO—, —SO— or $—SO_2—$; and $R_{21}$ to $R_{28}$ each is a hydrogen atom, a halogen atom, an alkyl group having 1 to 4 carbon atoms or an alkenyl group having 2 to 4 carbons Formula (3):

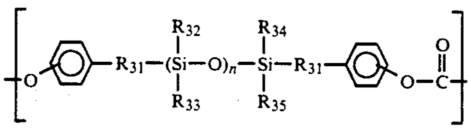

(3)

wherein $R_{31}$ is an alkylene group or alkylidene group having 2 to 6 carbon atoms; $R_{32}$ to $R_{35}$ each is an alkyl group having 1 to 3 carbon atoms, a phenyl group or a substituted phenyl group; and n represents an integer of 1 to 200; and said device unit holding as one unit said electrophotographic photosensitive member and at least one means selected from the group consisting of the charging means, the developing means and the cleaning means, and said unit being detachably provided in the body of an electrophotographic apparatus.

27. A facsimile machine comprising an electrophotographic apparatus and a receiver means for receiving image information from a remote terminal;

said electrophotographic apparatus comprising an electrophotographic photosensitive member; and said electrophotographic photosensitive member comprising a conductive support and a photosensitive layer provided thereon, wherein the surface layer of said electrophotographic photosensitive member contains a polymer having a component unit represented by the following Formula (1) and a polymer having a component unit represented by the following Formula (2) and a component unit represented by the following Formula (3)

Formula (1):

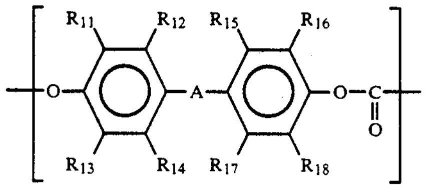

(1)

wherein A is a straight-chain, branched or cyclic alkylidene group having 1 to 15 carbon atoms, an aryl-substituted alkylidene group, an arylenedialkylidene group, or —O—, —S—, —CO—, —SO— or $—SO_2—$; and $R_{11}$ to $R_{18}$ each is a hydrogen atom, a halogen atom, an alkyl group having 1 to 4 carbon atoms, an alkenyl group having 2 to 4 carbons, or an aryl group Formula (2):

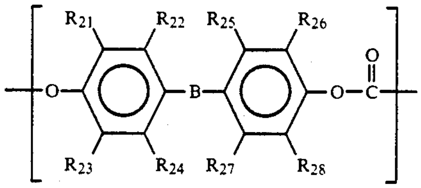

(2)

wherein B is a straight-chain, branched or cyclic alkylidene group having 1 to 10 carbon atoms, an aryl-substituted alkylidene group, an arylenedialkylidene group, or —O—, —S—, —CO—, —SO— or $—SO_2—$; and $R_{21}$ to $R_{28}$ each is a hydrogen atom, a halogen atom, an alkyl group having 1 to 4 carbon atoms or an alkenyl group having 2 to 4 carbons Formula (3):

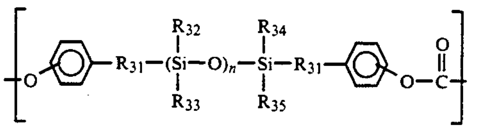

(3)

wherein $R_{31}$ is an alkylene group or alkylidene group having 2 to 6 carbon atoms; $R_{32}$ to $R_{35}$ each is an alkyl group having 1 to 3 carbon atoms, a phenyl group or a substituted phenyl group; and n represents an integer of 1 to 200.

* * * * *

UNITED STATES PATENT AND TRADEMARK OFFICE
CERTIFICATE OF CORRECTION

PATENT NO. : 5,254,423 Page 1 of 3

DATED : October 19, 1993

INVENTOR(S) : SHINYA MAYAMA, ET AL.

It is certified that error appears in the above-identified patent and that said Letters Patent is hereby corrected as shown below:

COLUMN 1

Line 47, "skelton" should read --skeleton--.

COLUMN 2

Line 2, "derivatives" should read --derivative--.
Line 6, "fall" should be deleted.
Line 27, "bisphenol-A" (second occurrence) should read --bisphenol-Z--.

COLUMN 10

Formula (5), " (Si should read -- (Si

| |
|---|
| R$_{31}$" R$_{33}$--. |

Line 17, "above; in" should read --above; ¶ in--.
Line 34, "(3 )," should read --(3),--.

COLUMN 11

Line 26, "Japnese" should read --Japanese--.
Line 66, "pyrazoline;" should read --pyrazoline,--.

COLUMN 12

Line 34, "acrylonitrilestyrene" should read --acrylonitrile-styrene--.

UNITED STATES PATENT AND TRADEMARK OFFICE

CERTIFICATE OF CORRECTION

PATENT NO. : 5,254,423

DATED : October 19, 1993

INVENTOR(S) : SHINYA MAYAMA, ET AL.

It is certified that error appears in the above-identified patent and that said Letters Patent is hereby corrected as shown below:

COLUMN 16

Line 33, "carried" should read --carried out--.

COLUMN 22

Line 28, "DD" should read --D--.
Line 39, "(3)" should read --(3):--.
Line 57, "aryl group" should read --aryl group;--.

COLUMN 23

Line 7, "carons" should read --carbons;--.

COLUMN 24

Line 62, "an" should read --a--.
Line 63, "pentomethylene" should read --pentamethylene--.

COLUMN 26

Line 11, "(3)" should read --(3):--.
Line 30, "group" should read --group;--.
Line 48, "carbons" should read --carbons;--.

COLUMN 27

Line 7, "(3)" should read --(3):--.
Line 26, "group" should read --group;--.
Line 45, "carbons" should read --carbons;--.

--

UNITED STATES PATENT AND TRADEMARK OFFICE
CERTIFICATE OF CORRECTION

PATENT NO. : 5,254,423

DATED : October 19, 1993

INVENTOR(S) : SHINYA MAYAMA, ET AL.

It is certified that error appears in the above-identified patent and that said Letters Patent is hereby corrected as shown below:

COLUMN 28

Line 14, "(3)" should read --(3):--.
Line 32, "group" should read --group;--.
Line 51, "carbons" should read --carbons;--.

Signed and Sealed this

Fifth Day of July, 1994

Attest:

BRUCE LEHMAN

*Attesting Officer* *Commissioner of Patents and Trademarks*

--